W. F. HUDSON.
MOTOR VEHICLE CONSTRUCTION.
APPLICATION FILED NOV. 22, 1919.

1,366,077.

Patented Jan. 18, 1921.

INVENTOR
William F. Hudson.
BY
William J. Jacobsen
ATTORNEY.

UNITED STATES PATENT OFFICE.

WILLIAM F. HUDSON, OF PHILADELPHIA, PENNSYLVANIA, ASSIGNOR TO HUDSON MOTOR SPECIALTIES COMPANY, OF PHILADELPHIA, PENNSYLVANIA, A CORPORATION OF PENNSYLVANIA.

MOTOR-VEHICLE CONSTRUCTION.

1,366,077.     Specification of Letters Patent.     Patented Jan. 18, 1921.

Application filed November 22, 1919. Serial No. 339,855.

*To all whom it may concern:*

Be it known that I, WILLIAM F. HUDSON, a citizen of the United States, residing at the city of Philadelphia, in the county of Philadelphia and State of Pennsylvania, have invented certain new and useful Improvements in Motor-Vehicle Constructions, of which the following is a specification.

This invention relates to a motor-vehicle construction and has more particular relation to the provision of spring seats and manner of attaching same to a Ford truck.

A Ford truck is equipped with a short frame terminating immediately over the rear axle thereof. The sills which support the body of the truck are extended rearwardly of the frame for a considerable distance. The tendency of these sills is to break off under loads due principally to the fact that, but a single spring, ranged cross-wise of the frame, is provided. Easy riding and a spring resiliency of a motor-vehicle depends upon the degree of spring suspension. A single cross spring gives very little and certainly not sufficient spring suspension. To overcome this defect and provide proper spring suspension necessitates the use of side springs. Practice dictates, however, that there is nothing upon a Ford truck suitable for supporting side springs. The cross spring of such truck is shackled at each end to a perch-post carried by a casting fixed to the tubular housing of the truck axle. It is thus observed that the weight sustained by the cross-spring is carried by said perch-posts and because of this fact it is essential, when substituting side-springs that the weight sustained thereby be carried at these points. To meet such requirement I have devised a spring seat for each side of the truck which is fixed to a perch-post so that the weight sustained by the side springs is carried by the perch posts, the spring seat merely resting upon the casting to which a perch-post is fixed and upon an outer end of the axle housing.

A detailed description of the invention will now be given reference being had to the accompanying drawings forming part thereof and in which.

Figure 1:
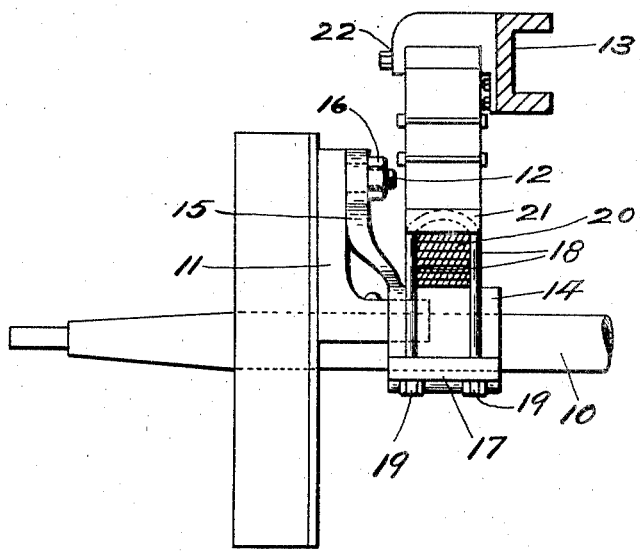
Figure 1, is a fragmentary view in cross-section of the spring-seat embodying features of the invention.
Figure 2:
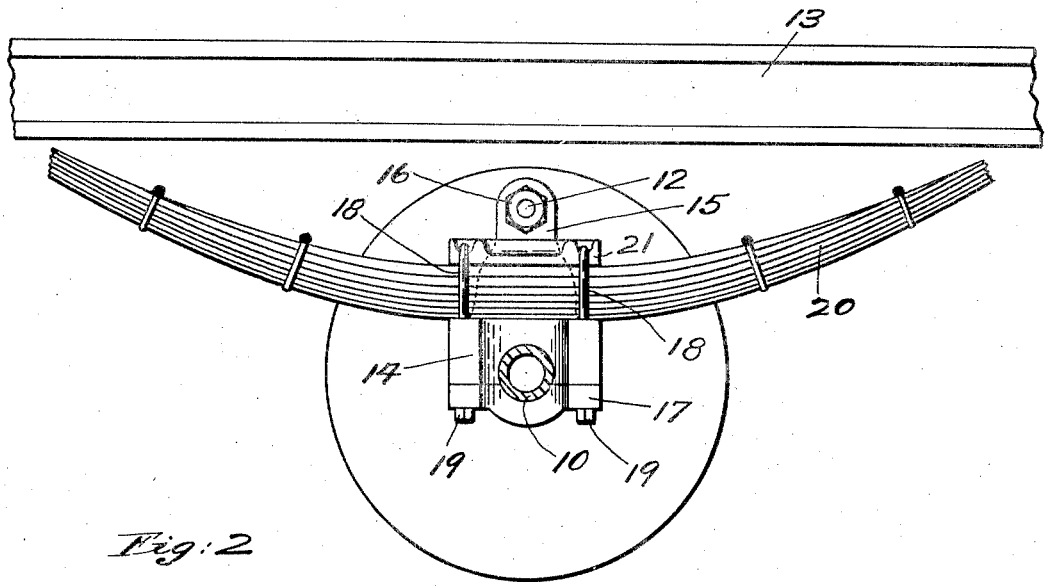
Fig. 2, is a view in elevation thereof.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalites as herein shown and described.

In the drawings 10 designates the rear axle housing of a Ford truck, 11 a perch-post support carried by said housing, 12 a perch-post fixed thereto and 13 a side-rail. The spring seat of the present invention is carried by the perch-post 12 so that the weight supported by the side spring hereinafter referred to is carried thereby. The spring seat comprises a horizontal plate 14 the underside of which is grooved to fit over the housing 10 and a portion of the support 11. The plate 14 terminates in a vertical arm 15 apertured for passage over the perch-post 12 and is adapted to abut against the perch-post support throughout a portion of its extent. The perch-post is provided with a screw-threaded end and a nut 16 is secured thereto for maintaining the spring-seat in position. Thus the spring-seat merely rests upon the tubular housing and perch-post support. Beneath the spring-seat is employed a U-bolt retainer 17 through which pass the ends of U-bolts 18, nuts 19 being utilized to secure a side spring 20 to the spring-seat. The spring-seat is slotted to accommodate said bolts and the retainer 17 is apertured for the some purpose. The U-bolts rest in a spring saddle 21 mounted upon the side spring 20. The side spring is secured to the side-rail 13 by means of a shackle and shackle-bolt connection 22.

By means of the above arrangement and connection of parts a much easier riding truck is provided, also, lengthening of the wheel-base of a truck is also provided for. That is, by using longer propeller shafts and extending the side-rails, it is possible to extend the rear axle back far enough to accommodate most any size truck body. By the above construction it is possible if desired to do away with radius rods with which Ford trucks are equipped. When radius rods are removed a stationary spring hanger is employed at the forward end of a side spring thereby providing a "Hotchkiss drive." As the Ford truck is provided with a worm-gear driven axle this feature is desirable.

It is of course understood that before adjusting to place my improved spring seat connection that the Ford cross-spring is disconnected and removed.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

In motor vehicle construction the combination with a side-rail, rear axle housing and a conventional perch-post support and its perch-post fixed upon said housing, of a spring-plate seated upon said support, an arm fixed to said spring-plate and bent outwardly therefrom so as to be in parallel, abutting position with said conventional perch-post support for at least a portion of its extent said arm being apertured, through which aperture said perch-post is projected, means for clamping the projected end of said perch-post with respect to said arm, a side-spring secured at its respective ends to said side-rail and seated upon said spring plate, and means including U-bolts, a retainer therefor and a spring-saddle for securing said spring to its seat.

In witness whereof I have hereunto signed my name.

WILLIAM F. HUDSON.